United States Patent [19]

Jaspers

[11] Patent Number: 6,094,205
[45] Date of Patent: Jul. 25, 2000

[54] SHARPNESS CONTROL

[75] Inventor: Cornelis A. M. Jaspers, Eindhoven, Netherlands

[73] Assignee: U.S. Philips Corporation, New York, N.Y.

[21] Appl. No.: 08/891,759

[22] Filed: Jul. 14, 1997

[30] Foreign Application Priority Data

Aug. 26, 1996 [EP] European Pat. Off. ............... 96202358

[51] Int. Cl.[7] .................................................... H04N 5/21
[52] U.S. Cl. ........................ 345/625; 348/631; 348/595; 348/234; 358/160; 358/166
[58] Field of Search ............................ 348/625, 630, 348/631, 578, 584, 586, 595, 234, 222; 358/160, 166; H04N 5/22

[56] References Cited

U.S. PATENT DOCUMENTS

| | | | |
|---|---|---|---|
| 4,758,891 | 7/1988 | Hitchcock et al. | 348/625 |
| 4,827,344 | 5/1989 | Astle et al. | 348/597 |
| 4,947,251 | 8/1990 | Hentschel | 358/166 |
| 4,994,915 | 2/1991 | Takahashi et al. | 358/162 |
| 5,038,387 | 8/1991 | Sakamoto | 382/54 |
| 5,038,388 | 8/1991 | Song | 382/54 |
| 5,050,223 | 9/1991 | Sumi | 348/625 |
| 5,196,736 | 3/1993 | Doornhein et al. | 307/263 |
| 5,276,506 | 1/1994 | Fujita | 348/578 |
| 5,321,511 | 6/1994 | Min | 348/625 |
| 5,335,069 | 8/1994 | Kim | 348/630 |
| 5,392,137 | 2/1995 | Okubo | 358/462 |
| 5,502,505 | 3/1996 | Nakata et al. | 348/595 |

FOREIGN PATENT DOCUMENTS

| | | | |
|---|---|---|---|
| 0241246 | 10/1987 | European Pat. Off. | H04N 5/14 |
| 0478024 | 1/1992 | European Pat. Off. | |
| 0525949A2 | 6/1992 | European Pat. Off. | |
| 3334898A1 | 12/1989 | Netherlands | |

*Primary Examiner*—Andrew I. Faile
*Assistant Examiner*—Reuben M. Brown
*Attorney, Agent, or Firm*—Edward W. Goodman

[57] ABSTRACT

In a method of enhancing a quality of a video signal (Yin), an absolute value (ST) of a first derivative of the video signal (Yin) is obtained (51–59), and the video signal (Yin) is processed (53–57, 61–69) in dependence upon the absolute value (ST) of the derivative of the video signal (Yin).

8 Claims, 3 Drawing Sheets

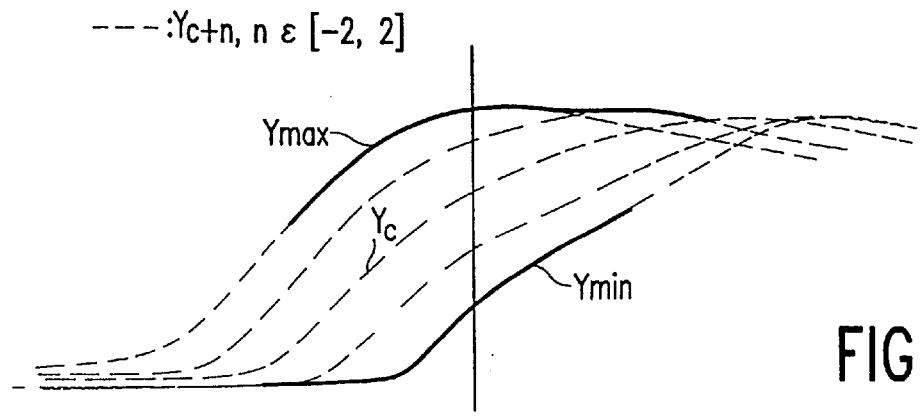
FIG. 3A
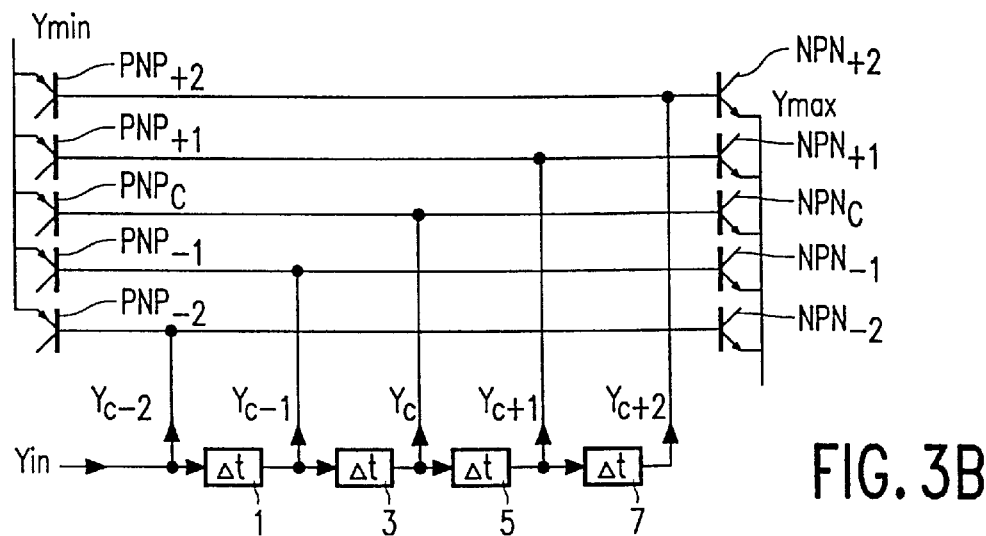
FIG. 3B
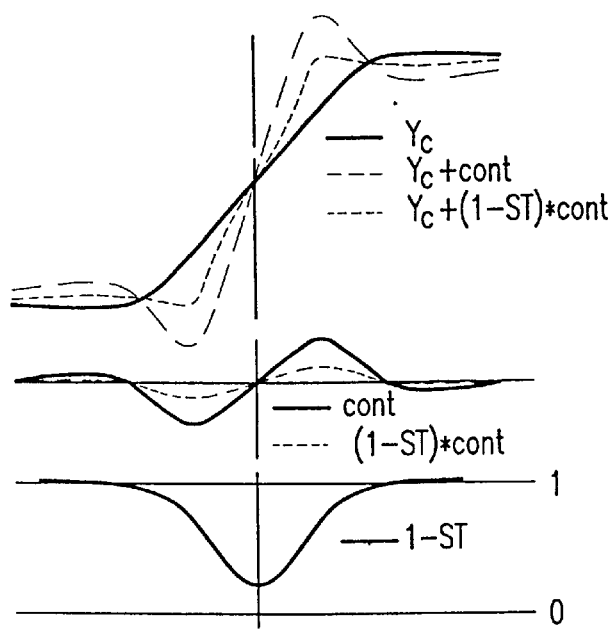
FIG. 4A
FIG. 4B
FIG. 4C

SHARPNESS CONTROL

BACKGROUND OF THE INVENTION

1. Field of the Invention

The invention relates to a method and apparatus for obtaining a sharpness control, and to a display apparatus comprising such a sharpness control.

2. Description of the Related Art

In conventional luminance transient improvement circuits, a minimum and a maximum value of an input sample, and a plurality of delayed input samples are obtained. A selection circuit determines whether a center delayed input sample, the minimum value or the maximum value is to be outputted. The selection circuit obtains a 2nd derivative of the input signal. If the 2nd derivative is clearly negative, the minimum value is output, while if the 2nd derivative is clearly positive, the maximum value is outputted. If the 2nd derivative is around zero, the center delayed input sample is outputted. However, the perception of the resulting step signal on a TV screen with various scenes has the disadvantage that fine scene details, like hair, grass, leaves, etc., become very unnatural. It looks like whether fine details of a photo have been cut and pasted, resulting in clearly visible artifacts at the cut and pasted transients.

In conventional peaking circuitry with Laplacian filters, used in television receivers and video cameras, overshoots and undershoots will occur at rather steep steps. The perception of such exaggerated "ears" is in contradiction to the idea to reproduce a sharper picture.

SUMMARY OF THE INVENTION

It is, inter alia, an object of the invention to provide an improved sharpness control. To this end, a first aspect of the invention provides a method of enhancing a quality of a video signal, the method comprising the steps of obtaining a first derivative of said video signal; obtaining an absolute value of said first derivative of said video signal; and processing said video signal in dependence upon said absolute value of said first derivative of said video signal. A second aspect of the invention provides an apparatus for enhancing a quality of a video signal, the apparatus comprising means for obtaining a first derivative of said video signal; means for obtaining an absolute value of said first derivative of said video signal; and means for processing said video signal in dependence upon said absolute value of said first derivative of said video signal. A third aspect of the invention provides a display apparatus, the display apparatus comprising means for receiving and processing a video signal; an apparatus for enhancing a quality of a video signal as set forth above; and means for displaying an output signal of said enhancing apparatus. A fourth aspect of the invention provides a camera comprising a sensor for picking up an image to provide a video signal; an apparatus for enhancing a quality of said video signal as set forth above; and means for furnishing an output signal of said enhancing apparatus.

In a method of enhancing a quality of a video signal in accordance with the present invention, an absolute value of a first derivative of the video signal is obtained, and the video signal is processed in dependence upon the absolute value of the derivative of the video signal.

One aspect of the invention is based on the recognition that in order to avoid artifacts in small and fine scene details, the step improvement should be proportionally decreased to zero at smaller low frequency signal amplitudes and become zero for high frequencies. Put otherwise, the step improvement should proportionally be active at larger low frequency signals. In one embodiment, this is obtained by generating a step transient detection signal, and by using this step transient detection signal to fade between a luminance transient improvement signal and a high pass signal. In another aspect of the invention, over- and undershoots are kept under control in case of a large step in the video signal while it is prevented that a full contour enhancement (peaking) is carried out.

These and other aspects of the invention will be apparent from and elucidated with reference to the embodiments described hereinafter.

BRIEF DESCRIPTION OF THE DRAWINGS

In the drawings:

FIGS. 3A–3B illustrate a min-max circuit and its manner of operation;

FIGS. 4A–4C illustrate the operation of a contour enhancement circuit in accordance with the present invention;

DESCRIPTION OF THE PREFERRED EMBODIMENTS

Figure 1A:
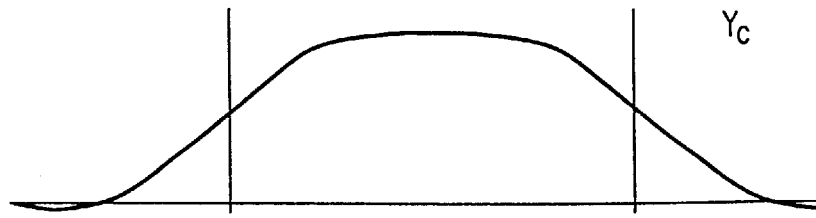
FIGS. 1A–1C illustrate an embodiment for realizing a step transient detection signal in accordance with the present invention.
Figure 1B:
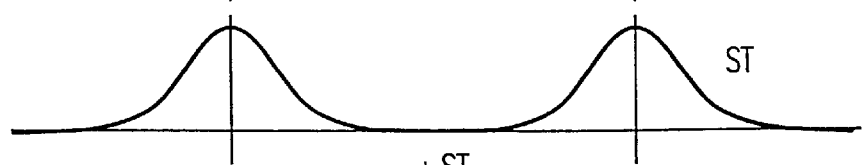
Figure 1C:
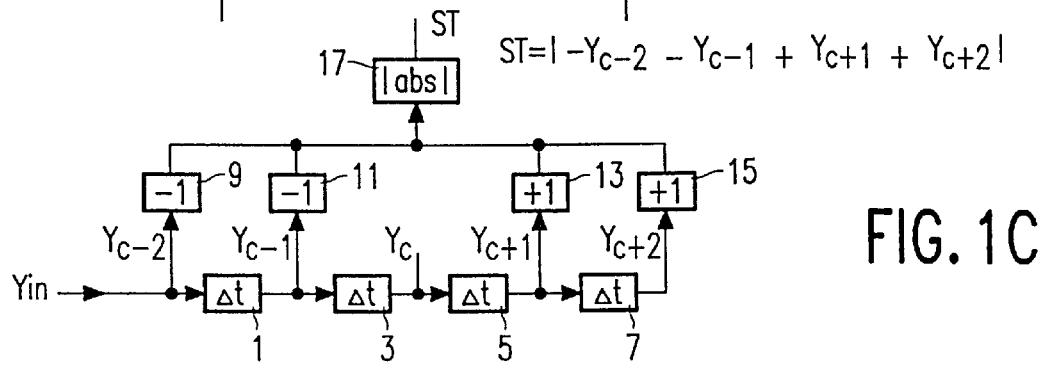

A proportional control at larger low-frequency signals is possible by means of an edge detector with the absolute signal amplitude as output. This will be called a step transient detector. FIGS. 1A–1C illustrate a realization of a step transient detection signal ST with a delay line 1, 3, 5, 7 having 5 taps and tap coefficients of multipliers 9, 11, (absent), 13, 15 being −1, −1, 0, +1, +1 to obtain a 1st derivative of an input luminance signal Yin. The step transient detection signal ST is normalized to one (not shown) by dividing the absolute value (obtained by absolute value circuit 17) of the 1st derivative by the full scale signal amplitude. FIG. 1A shows the luminance signal Yc at the center tap of the delay line at an increasing edge and at a decreasing edge of the luminance signal, FIG. 1B shows the resulting step transient detection signal ST, and FIG. 1C shows an embodiment to obtain the step transient detection signal ST.

Figure 2A:
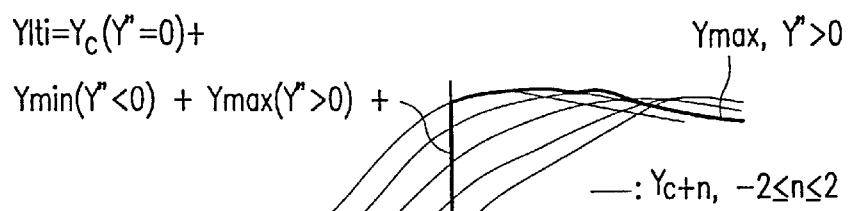
FIGS. 2A–2D illustrate a sharpness control utilizing the step transient detection signal.
Figure 2B:
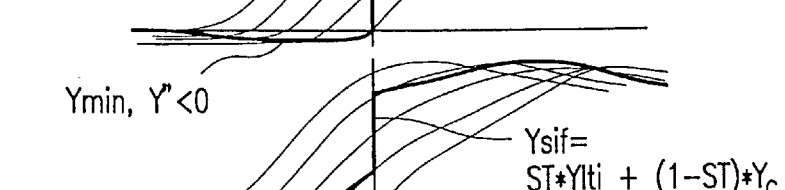
Figure 2C:
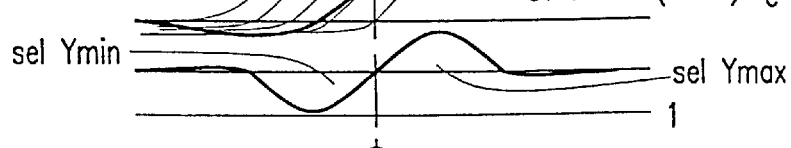
Figure 2D:
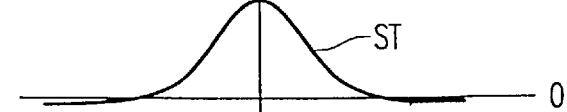

The polarity independent step transient detection signal ST is supplied to a fader circuit 63 (shown in FIG. 5) which fades between a luminance transient improved signal Ylti and the luminance signal Yc at the center tap of the delay line 1, 3, 5, 7 in dependence upon the step transient detection signal ST. The output signal of the fader circuit 63 is expressed by Ysif=ST*Ylti +(1−ST)*Yc. In FIG. 2A, fine lines show the luminance signals $Y_{c+n}$ for −2≦n<+2 at the 5 taps of the delay line 1, 3, 5, 7. A heavy line shows the luminance transient improved signal Ylti, which is the minimum Ymin of the luminance signals $Y_{c+n}$ when the 2nd derivative of the luminance signal is clearly negative, which is the center tap signal Yc when the 2nd derivative Y" is around zero, and which is the maximum Ymax of the luminance signals $Y_{c+n}$ when the 2nd derivative Y" of the luminance signal is clearly positive. FIG. 2B shows the output signal Ysif of the fader circuit 63. FIG. 2C shows the second derivative Y" of the luminance signal. FIG. 2D shows the step transient detection signal ST.

FIGS. 3A–3B illustrate a circuit to obtain the minimum value Ymin and the maximum value Ymax from the tap signals $Y_{c+n}$, and the manner of operation of such a min-max circuit. The base terminals of five PNP transistors $PNP_{-2}$–$PNP_{+2}$ are respectively connected to the five taps of the delay line 1, 3, 5, 7; the minimum value Ymin can be obtained from the thru-connected emitter terminals of the five PNP transistors $PNP_{-2}$–$PNP_{+2}$. The base terminals of five NPN transistors $NPN_{-2}$–$NPN_{+2}$ are respectively connected to the five taps of the delay line 1, 3, 5, 7; the maximum value Ymax can be obtained from the thru-connected emitter terminals of the five NPN transistors $NPN_{-2}$–$NPN_{+2}$.

A second aspect of the invention is that the step transient detection signal ST can also, or alternatively be used to control a peaking overshoot of a peaking filter. A well known disadvantage of Laplacian peaking filters is that at rather steep steps too much overshoot will happen, causing well visible exaggerated "ears". That means: too dark close before and too light close after a positive step, and the opposite in case of a negative going step. To prevent this overshoot from occurring, the step transient detection signal can be applied to reduce the overshoots of the peaking filter. The algorithm is: Ypeak=(1−ST)*cont, where cont is the contour signal and Ypeak is the corrected output signal of the peaking filter. FIGS. 4A–4C show the results of such an overshoot reduction. FIG. 4C shows 1−ST. FIG. 4B shows the contour signal cont by means of an uninterrupted line, and the corrected contour signal (1−ST)*cont by means of a dotted line. FIG. 4A shows the center tap signal Yc by means of a solid line, the center tap signal Yc plus a non-corrected contour signal by means of a dashed line, and the corrected peaked luminance signal Yc+(1−ST)*cont by means of a dotted line.

Figure 5:
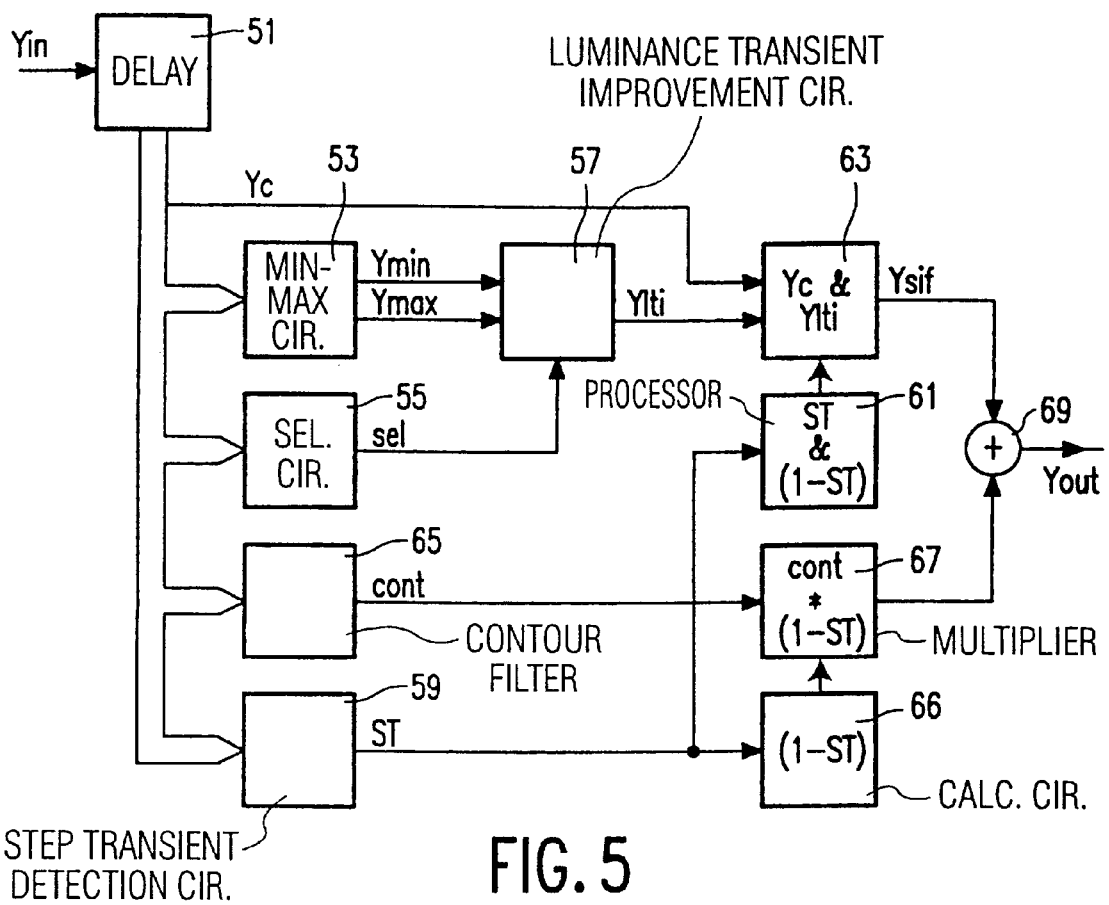
FIG. 5 illustrates an embodiment of a step transient controlled sharpness improvement circuit in accordance with the present invention.

FIG. 5 shows a preferred embodiment of a complete step transient controlled sharpness circuit. The input luminance signal Yin is applied to a delay block 51 which comprises the four delay cells 1, 3, 5, 7. The center tap signal Yc is applied to the Yc & Ylti fader 63. All five tap signals from the delay block are applied to a min-max circuit 53 to obtain the signals Ymin and Ymax as has been described with reference to FIG. 3. The five tap signals from the delay block 51 are also applied to a selection circuit 55 to obtain a selection signal sel in dependence upon the second derivative Y" of the luminance signal to control luminance transient improvement circuit 57 in such a manner that a luminance transient improved signal Ylti is furnished, as has been described with reference to FIG. 2A. The five tap signals from the delay block 51 are also applied to a contour filter 65 to obtain the contour signal cont as shown in FIG. 4B, and to a step transient detection circuit 59 to obtain the step transient detection signal ST as has been described with reference to FIG. 1C.

A circuit 66 calculates (1−ST) from the step transient detection signal ST; the result is applied to a multiplier 67 to obtain the signal cont*(1−ST). The step transient detection signal ST is also applied to a processor 61 to apply both ST and (1−ST) to the fader 63. Output signals of the fader 63 and the multiplier 67 are applied to an adder 69 to obtain a sharpened output luminance signal Yout.

The embodiment of FIG. 5 features the following preferred aspects of the invention:
 the step transient detector, comprising means for deriving a 1st derivative of the input signal, followed by an absolute value circuit;
 the step transient detection signal dependent control of the luminance transient improvement signal Ylti by fading it complementary with the center tap signal Yc; and
 the multiplication of the contour signal with (1−ST) to obtain a step transient controlled peaking.

While, in a preferred embodiment, both a luminance transient improvement and a peaking are carried out in dependence upon a step transient detection signal, the invention also relates to applications in which only a luminance transient improvement or only a peaking or only some other step transient detection signal dependent image enhancement is present.

Figure 6:
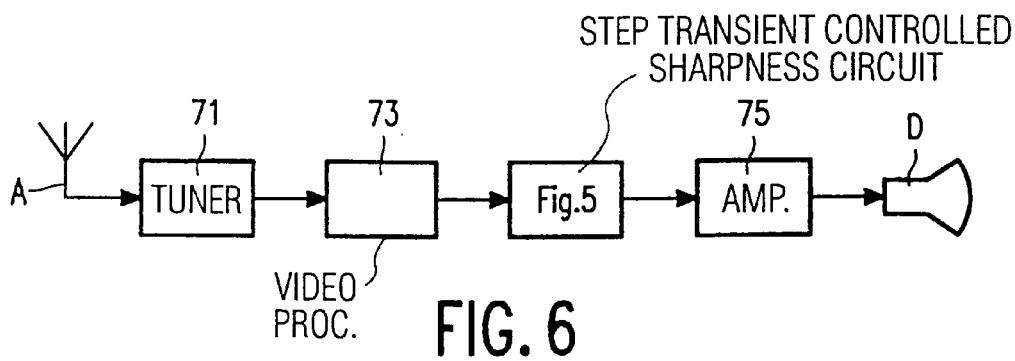
FIG. 6 illustrates an embodiment of a display apparatus in accordance with the present invention which comprises the circuit of FIG. 5.

As illustrated in FIG. 6, the step transient controlled sharpness circuit of FIG. 5 is preferably applied in a display apparatus having a tuner 71 which receives television signals from an antenna A, a video processor 73 which carries out all usual video processing operations on the video signal received from the tuner 71, the circuit of FIG. 5, and an output amplifier block 75 to make the output luminance signal Yout from the circuit of FIG. 5 suitable for display on a display unit D.

Figure 7:
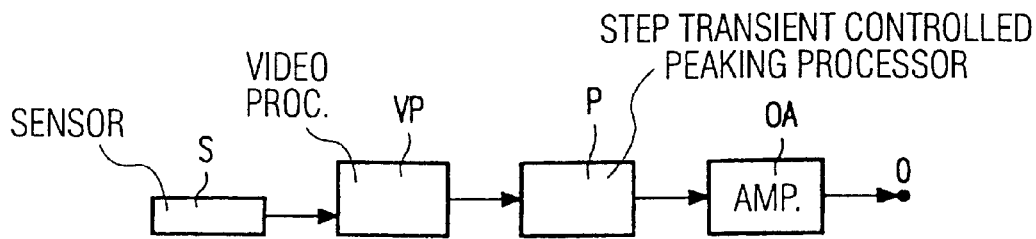
FIG. 7 illustrates an embodiment of a camera in accordance with the present invention.

FIG. 7 illustrates an embodiment of a camera in accordance with the present invention. An image is picked up by a sensor S and processed by a video processor VP. A step transient controlled peaking processor P includes the elements 51, 59, and 65–67 of FIG. 5. An output amplifier OA amplifies the output signal of the peaking procesor P and furnishes a camera output signal to an output O.

The advantages of step transient detection signal controlled luminance transient improvement and contour enhancement are as follows. A natural looking luminance transient improvement performance is obtained because the luminance transient improvement is proportionally activated to larger steps in the scene and inactivated for fine scene details, like hair, grass, leaves, etc. This not being activated is the most important goal of the step transient detection signal controlled luminance transient improvement because very unnatural looking details are avoided now. Further, a balanced enhancement of details is obtained because at small step transient detection signals details are emphasized, while at large step transient detection signals, corresponding to more course details, the details are reduced. Moreover, this reduction by the step transient detection signal acts as a very nice limiter of large positive as well as negative peaking amplitudes, so avoiding over- and undershoots.

It should be noted that the above-mentioned embodiments illustrate rather than limit the invention, and that those skilled in the art will be able to design many alternative embodiments without departing from the scope of the appended claims. The invention can be implemented by means of hardware comprising several distinct elements, and by means of a suitably programmed computer.

What is claimed is:

1. A method of enhancing a quality of a video signal, the method comprising the steps:
 forming a first derivative of said video signal;
 forming an absolute value of said first derivative of said video signal; and
 processing said video signal in dependence upon said absolute value of said first derivative of said video signal, wherein said processing step comprises the steps:

deriving a contour signal from said video signal;

forming a complementary factor of said absolute value by subtracting said absolute value from unity; and multiplying said contour signal by said complementary factor.

2. An apparatus for enhancing a quality of a video signal, the apparatus comprising:

means for forming a first derivative of said video signal;

means for forming an absolute value of said first derivative of said video signal; and means for processing said video signal in dependence upon said absolute value of said first derivative of said video signal, wherein said processing means comprises:

means for deriving a contour signal from said video signal;

means for forming a complementary factor of said absolute value by subtracting said absolute value from unity; and means for multiplying said contour signal by said complementary factor.

3. A display apparatus for displaying a video signal, the display apparatus comprising:

means for receiving and processing a video signal;

an apparatus for enhancing a quality of a video signal, said enhancing apparatus comprising:

means for forming a first derivative of said video signal;

means for forming an absolute value of said first derivative of said video signal; and means for processing said video signal in dependence upon said absolute value of said first derivative of said video signal, wherein said processing means comprises:

means for deriving a contour signal from said video signal;

means for forming a complementary factor of said absolute value by subtracting said absolute value from unity; and means for multiplying said contour signal by said complementary factor.

4. A camera comprising:

a sensor for picking up an image to provide a video signal;

an apparatus for enhancing a quality of said video signal, said enhancing apparatus comprising:

means for obtaining a first derivative of said video signal;

means for obtaining an absolute value of said first derivative of said video signal; and means for processing said video signal in dependence upon said absolute value of said first derivative of said video signal, said processing means comprising:

means for deriving a contour signal from said video signal;

means for forming a complementary factor of said absolute value by subtracting said absolute value from unity; and means for multiplying said contour signal by said complementary factor.

5. The method as claimed in claim 1, wherein the processing step further comprises:

forming a luminance transient improved signal from said video signal;

fading said luminance transient improved signal complementary with said video signal in dependence on said absolute value of said first derivative of said video signal; and adding said multiplied contour signal and said faded luminance transient improved signal to form an enhanced video signal.

6. The apparatus as claimed in claim 2, wherein said apparatus further comprises:

means for forming a luminance transient improved signal from said video signal;

means for fading said luminance transient improved signal complementary with said video signal in dependence upon said absolute value of said first derivative of said video signal; and means for adding an output signal of said fading means and an output signal of said multiplying means to form an enhanced video signal.

7. The display apparatus as claimed in claim 3, wherein said display apparatus further comprises:

means for forming a luminance transient improved signal from said video signal;

means for fading said luminance transient improved signal complementary with said video signal in dependence upon said absolute value of said first derivative of said video signal; and means for adding an output signal of said fading means and an output signal of said multiplying means to form an enhanced video signal.

8. The camera as claimed in claim 2, wherein said camera further comprises:

means for forming a luminance transient improved signal from said video signal;

means for fading said luminance transient improved signal complementary with said video signal in dependence upon said absolute value of said first derivative of said video signal; and means for adding an output signal of said fading means and an output signal of said multiplying means to form an enhanced video signal.

* * * * *